(12) United States Patent
Bach et al.

(10) Patent No.: US 10,863,253 B2
(45) Date of Patent: Dec. 8, 2020

(54) METHOD FOR OPERATING A MOBILE READOUT SYSTEM AND READOUT RECEIVER

(71) Applicant: DIEHL METERING SYSTEMS GMBH, Nuremberg (DE)

(72) Inventors: Guy Bach, Waldighoffen (FR); Bernard Dockwiller, Saint Bernard (FR); Eric Perrin, Obermorschwihr (FR); Thomas Blank, Merkendorf (DE); Petra Joppich-Dohlus, Rathsberg (DE); Thomas Kauppert, Nuremberg (DE); Klaus Gottschalk, Winkelhaid (DE); Stefan Herr, Emtmannsberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/503,778

(22) Filed: Jul. 5, 2019

(65) Prior Publication Data

US 2020/0014989 A1    Jan. 9, 2020

(30) Foreign Application Priority Data

Jul. 5, 2018    (DE) .................. 10 2018 005 368

(51) Int. Cl.
*H04Q 9/00*    (2006.01)

(52) U.S. Cl.
CPC .......... *H04Q 9/00* (2013.01); *H04Q 2209/50* (2013.01); *H04Q 2209/60* (2013.01)

(58) Field of Classification Search
CPC .................. H04Q 2209/60; G01D 4/004
See application file for complete search history.

(56) References Cited

U.S. PATENT DOCUMENTS

| | | | | |
|---|---|---|---|---|
| 6,163,277 | A * | 12/2000 | Gehlot | G08G 1/052 340/539.1 |
| 2010/0026517 | A1 | 2/2010 | Cumeralto et al. | |
| 2010/0176967 | A1* | 7/2010 | Cumeralto | G01D 4/006 340/870.02 |

(Continued)

FOREIGN PATENT DOCUMENTS

DE    102005034102 B4    12/2007

*Primary Examiner* — Fabricio R Murillo Garcia
(74) *Attorney, Agent, or Firm* — Laurence A. Greenberg; Werner H. Stemer; Ralph E. Locher

(57) ABSTRACT

A method operates a mobile readout system having at least one stationary consumption meter and a mobile readout receiver for reading out the consumption meter as the readout receiver moves past the consumption meter. A two-way communication takes place between the consumption meter and the readout receiver by using the consumption meter to transmit status information stored in the consumption meter, using the readout receiver to receive the status information, using the readout receiver to request additional information from the consumption meter by using a request command, and transmitting encrypted additional information from the consumption meter to the readout receiver. A readout receiver having a receiver for acquiring data from a plurality of spatially distributed consumption meters by using radio transmission according to the method is also provided.

18 Claims, 6 Drawing Sheets

(56) References Cited

U.S. PATENT DOCUMENTS

| | | | |
|---|---|---|---|
| 2010/0308967 A1* | 12/2010 | Lauronen | G06K 19/0705 340/10.1 |
| 2011/0004764 A1* | 1/2011 | Stuber | G01D 4/004 713/176 |
| 2014/0285358 A1* | 9/2014 | Drachmann | G01D 4/002 340/870.02 |
| 2015/0116128 A1* | 4/2015 | Hald | H04Q 9/00 340/870.02 |

* cited by examiner

METHOD FOR OPERATING A MOBILE READOUT SYSTEM AND READOUT RECEIVER

CROSS-REFERENCE TO RELATED APPLICATION

This application claims the priority, under 35 U.S.C. § 119, of German Patent Application DE 10 2018 005 368.8, filed Jul. 5, 2018; the prior application is herewith incorporated by reference in its entirety.

BACKGROUND OF THE INVENTION

Field of the Invention

The present invention relates to a method for operating a mobile readout system including at least one stationary consumption meter and a mobile readout receiver for reading out the consumption meter as the readout receiver moves past the consumption meter. The present invention furthermore relates to a readout receiver having a receiver for acquiring data from a plurality of spatially distributed consumption meters.

Data transmission from metering units, such as e.g. sensors, consumption meters or consumption data recording devices or components of smart home controllers, is becoming increasingly important in everyday use. One important field of application of metering units is the use of intelligent consumption meters, also known as smart meters. They are normally consumption meters incorporated into a supply network, e.g. for energy, power, gas or water, which indicate actual consumption to the respective connection user. The consumption data can be transmitted to the provider in different ways. Intelligent consumption meters offer the advantage that manual meter readings are no longer required and shorter-term billing can be implemented by the provider according to actual consumption. Shorter-term reading intervals in turn enable a more accurate linkage between end customer tariffs and the development of trading prices for electricity. The supply networks can also be substantially more effectively utilized.

Generic consumption meters normally transmit the accrued data in the form of data packets or data messages through a radiocommunication link, for example in the SRD (Short Range Devices) or ISM (Industrial, Scientific, Medical) frequency range to higher-level data collectors, such as e.g. readout units, concentrators, network node points or central control rooms of the provider. Data messages are normally made up of a plurality of data packets. The SRD or ISM frequency ranges offer the advantage that they are license-free and only a general permit from the frequency authority is required for use.

Intelligent metering infrastructures are increasingly used to record consumption data. In those metering infrastructures (consumption data recording systems), the consumption meters represent the terminal devices through the use of which measurement data are acquired at the consumption points. The metering data are transmitted from the consumption meters through intermediate data collectors, such as e.g. readout units, to a higher-level management system or head-end system.

Electronic consumption meters with a radio transmitter for wireless data transmission are frequently used for walk-in, walk-by, drive-by or fly-by reading. For that purpose, the metering devices are read by using a mobile radio receiver by customer service personnel from a vehicle (drive-by) or on foot (walk-by) without having to enter the building to be read. In the case of intelligent consumption meters, energy consumption, on one hand, since these meters are mainly battery-controlled and are intended to have the longest possible maintenance intervals, and operational reliability, on the other hand, are of decisive importance. In the above-mentioned reading methods, radio messages are frequently transmitted throughout the entire year, even if no reading is currently being carried out or no recording device is located within range. A need therefore exists to reduce the power consumption of consumption meters while operational reliability remains the same.

Description of the Related Art

In German Patent DE 10 2005 034 102 B4, a method is disclosed for the radio transmission of data from a plurality of spatially distributed transmitters of measuring devices to a receiver of a mobile readout unit. The data are transmitted independently by the measuring devices through their transmitter and are received automatically by the receiver of the mobile readout unit. However, no restriction is provided for the data transmitted by the measuring devices, resulting in a high energy consumption in the measuring devices.

SUMMARY OF THE INVENTION

It is accordingly an object of the invention to provide a method for operating a mobile readout system and a readout receiver, which overcome the hereinafore-mentioned disadvantages of the heretofore-known methods and receivers of this general type and in which an increased operational flexibility is enabled simultaneously with an advantageous energy efficiency with reduced maintenance intensity and without adversely affecting operational reliability.

With the foregoing and other objects in view there is provided, in accordance with the invention, a method for operating a mobile readout system having at least one stationary consumption meter and a mobile readout receiver to read out the consumption meter as the readout receiver moves past the consumption meter, the method comprising carrying out a two-way communication between the consumption meter and the readout receiver as follows:

transmission by the consumption meter of status information which is stored in the consumption meter;
  reception of the status information by the readout receiver;
  requesting by the readout receiver of additional information from the consumption meter by using a request command; and
  encrypted transmission of additional information from the consumption meter to the readout receiver.

The consumption meter transmits status information by default, in particular without a previous request command. This status information can be received by the readout receiver, as a result of which the current status of the consumption meter is reported to the readout receiver. The readout receiver can thus ascertain directly whether the consumption meter has a particular status. The readout receiver can request additional information from the consumption meter on the basis of the status transmitted from the consumption meter to the readout receiver. The request is made through a request command, for example by a defined command, such as "REQ_UD", which is defined in the German Industry Standard DIN EN 13757-4 or (wireless) M-Bus standard. The consumption meter responds directly to the request command by transmitting additional information to the readout receiver. This additional information is encrypted and is transmitted in encrypted form. The additional information can relate to the status of the consumption meter. The additional information can be received and stored by the readout receiver. This offers the advantage that the energy requirement of the consumption meter decreases, since no continuous transmission of all data or information takes place. Only status information having small data volumes is continuously transmitted. There is furthermore no need to set up a two-way communication with each consumption meter, thus allowing a readout at higher relative speeds between the readout receiver and the consumption meter. A two-way communication can be set up if status information or an alarm is present in a consumption meter. The request command can advantageously have been defined in advance and the additional information to be transmitted can already be collected and held ready for transmission by the consumption meter prior to a request from the readout receiver. This can additionally contribute to a faster communication and therefore higher relative speeds between the readout receiver and the consumption meter.

The status information can preferably be transmitted by the consumption meter in unencrypted form. The transmission of the status information as unencrypted messages eliminates the need for decryption keys to be held in the readout receiver. The readout receiver can thereby directly recognize the status or the presence of a special status in the consumption meter. There is furthermore no need for an elaborate securing of transmission keys in the readout receiver.

The method can furthermore appropriately include:
transmission by the consumption meter of preferably encrypted consumption data which are stored in the consumption meter; and
reception by the readout receiver of the preferably encrypted consumption data.

The transmission of consumption data, preferably encrypted consumption data, can appropriately take place independently from the transmission of status information. The possibility therefore exists, for example, between the consumption meter and the readout receiver, for only a one-way communication to take place from the consumption meter to the readout receiver if the status information of the consumption meter does not prompt the readout receiver to request additional information.

The status information can appropriately include characteristic status data and/or alarms, in particular characteristic alarm status data. The particular status of the consumption meter may, for example, be an alarm or a leakage alarm. In one possible configuration, this status information can be transmitted by the consumption meter in unencrypted form.

The additional information to be transmitted can be defined by the readout receiver prior to a request command if an indication of which additional information is to be transmitted is stored in the firmware of the consumption meter. Since the readout of the consumption meter is performed in a passing movement, a fast message exchange is important in the two-way communication. A fast communication can thus be guaranteed due to the prior definition of the additional information to be transmitted. The consumption meter can thus advantageously collect the additional information to be transmitted and hold it ready for transmission.

The request command from the readout receiver to the consumption meter for the transmission of additional information can advantageously be transmitted in unencrypted form. This offers the advantage that the encryption keys do not have to be stored in the readout receiver, thereby increasing the security of the readout receiver. There is furthermore no need to hold decryption keys in the consumption meter and a request command can be interpreted more quickly.

At least two options can appropriately be defined for the request command, wherein different additional information elements are transmitted in the case of each option. Two defined commands, for example, such as "REQ_UD1" and "REQ_UD2", which are defined in the DIN EN 13757-4 or (wireless) M-Bus standard can be used as request commands. The possibility thus exists to transmit different additional information elements, depending on the request command. The readout receiver therefore additionally has the possibility of requesting the additional information according to requirements. Different additional information elements, for example, can be requested by the readout receiver depending on the status information of the consumption meter. The possibility furthermore exists for historical data to be retrieved from the consumption meter.

In a first alternative configuration, the keys for decrypting the communication can be stored in the readout receiver. The encryption may include, for example, the Advanced Encryption Standard (AES). The stored keys may include keys for the encrypted additional information and/or for the encryption of the request command and/or for encrypted status information. The possibility therefore exists for each communication to take place in encrypted form.

In a second alternative configuration, the keys for decrypting the communication may not be stored in the readout receiver. The additional information received from the consumption meter is encrypted and is stored in the readout receiver. Since the keys are not stored in the readout receiver, the additional information cannot be directly decrypted in the readout receiver. However, this has no impact on the two-way communication between the consumption meter and the readout receiver, since the status information from the consumption meter and the request command from the readout receiver are transmitted in unencrypted form.

The keys for decrypting the communication are advantageously stored in a head-end system. The head-end system can be present at a stationary location. The security of the keys in the head-end system can thus be guaranteed more easily than if, for example, the keys were also carried in the readout receiver.

The additional information stored in the readout receiver can appropriately be transferred into the head-end system and can be decrypted in the head-end system. The possibility thus exists to carry out an offline diagnosis at the central location where the head-end system is present.

The possibility exists for the relative speed between the consumption meter and the readout receiver to be up to 70 kilometers per hour, in particular up to 50 kilometers per hour. This offers the advantage that the readout is not dependent on the speed of the passing movement.

The possibility appropriately exists for the passing movement for the readout of the consumption meter not to be interrupted, in particular for the relative speed not to be equal to zero kilometers per hour. It is thus advantageously not necessary to adjust the speed or driving behavior during the readout by the readout receiver.

It is particularly appropriate for the relative speed to be reduced for the readout by less than 50%, in particular by less than 20%, in particular by less than 10%, in particular no reduction of the relative speed takes place.

With the objects of the invention in view, there is concomitantly provided a readout receiver, comprising a receiver for acquiring data from a plurality of spatially distributed consumption meters by using radio transmission and being operable according to the method.

Other features which are considered as characteristic for the invention are set forth in the appended claims.

Although the invention is illustrated and described herein as embodied in a method for operating a mobile readout system and a readout receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
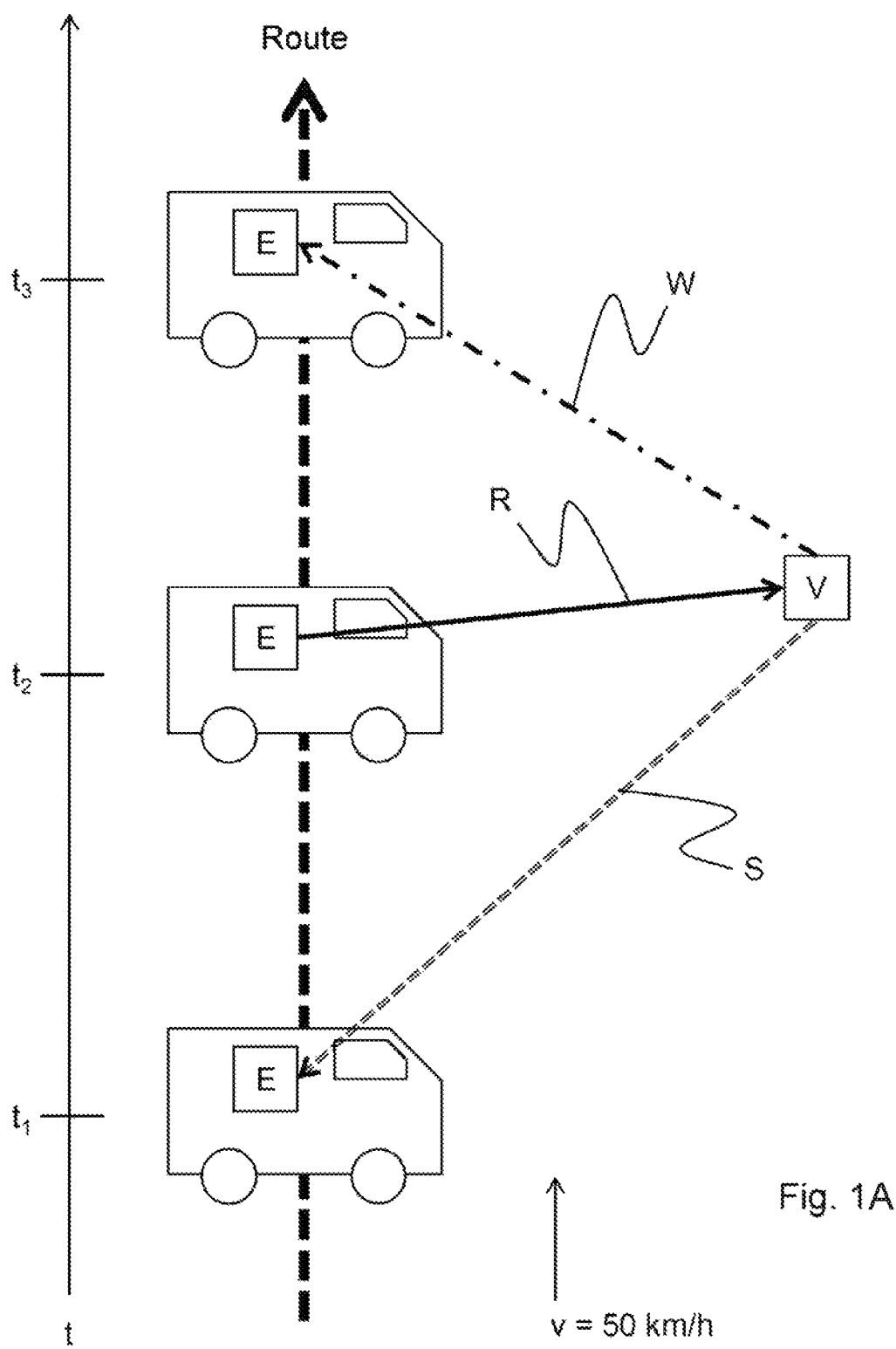
FIGS. 1A-1C are simplified schematic views illustrating communications between a consumption meter and a readout receiver during a passing movement.

Referring now to the figures of the drawings in detail and first, particularly, to FIG. 1A thereof, there is seen a simplified, schematic representation of a two-way communication between a stationary consumption meter V and a mobile readout receiver E. The mobile readout receiver is located, for example, in a vehicle. The vehicle may, for example, be a waste collection vehicle or sanitation truck which reads out the consumption meters located on its route by using a drive-by reading. During the passing movement, the vehicle moves at a speed corresponding to the normal traffic flow. The relative speed between the consumption meter V and the readout receiver E is thus up to 70 kilometers per hour during the passing movement. The passing movement does not have to be interrupted and there is no need to stop to read out the consumption meter V. There is also no need to reduce the speed or relative speed during the readout.

The consumption meter V transmits status information S by default, even before the vehicle reaches the readout receiver E. The status information S is unencrypted and includes, for example, characteristic status data, alarms and/or characteristic alarm status data, such as leakage alarms. This may involve an "SND_NR" command of an M-bus or wireless M-bus. The readout receiver E receives the status information S from the consumption meter V at time $t_1$. The readout receiver E checks the content of the status bytes in the status information S. If an alarm bit and/or an error bit is set, the readout receiver E requests additional data from the consumption meter V. On the basis of the received status information S, the readout receiver E transmits a request command R at time $t_2$ to request additional information W from the consumption meter. An "REQ_UD" command or "REQ_UD1" command, for example, which is defined in the DIN EN 13757-4 or the (wireless) M-Bus standard can be used as the request command R. The request command R is transmitted in unencrypted form from the readout receiver E to the consumption meter V. An indication of which additional information W is transmitted in response to the request command R is stored in the firmware of the consumption meter V. The additional information W is transmitted in encrypted form at time $t_3$ by using an encrypted "RSP_UD" message. The consumption meter V is configured to transmit special additional information W in an "RSP_UD" message in response to a request by using an "REQ_UD1" command. The encrypted additional information W is received and stored in the readout receiver E. The readout receiver E itself does not have the keys for decrypting the encrypted additional information W. No keys are therefore required in the readout receiver E for the entire two-way communication between the consumption meter V and the readout receiver E. The possibility furthermore exists to use a "frequent access cycle" (FAC) for repetitions where N=1. An "SND_NKE" command is transmitted to end the FAC.

Figure 1B:
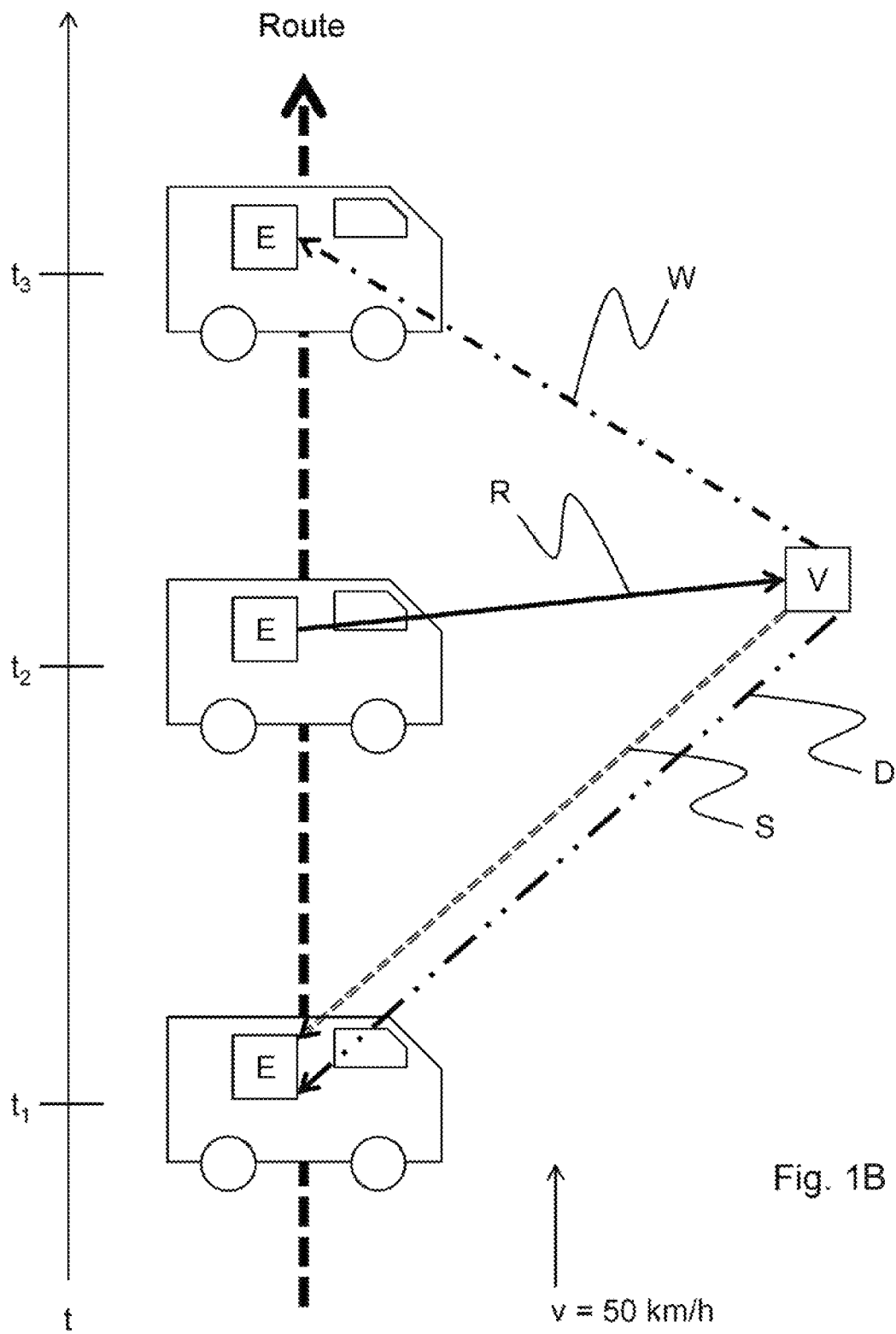

Along with the status information S, the consumption meter V in FIG. 1B additionally transmits consumption data D. The consumption data D are received and stored by the readout receiver E. The consumption data D are preferably encrypted or are transmitted in encrypted form.

Figure 1C:
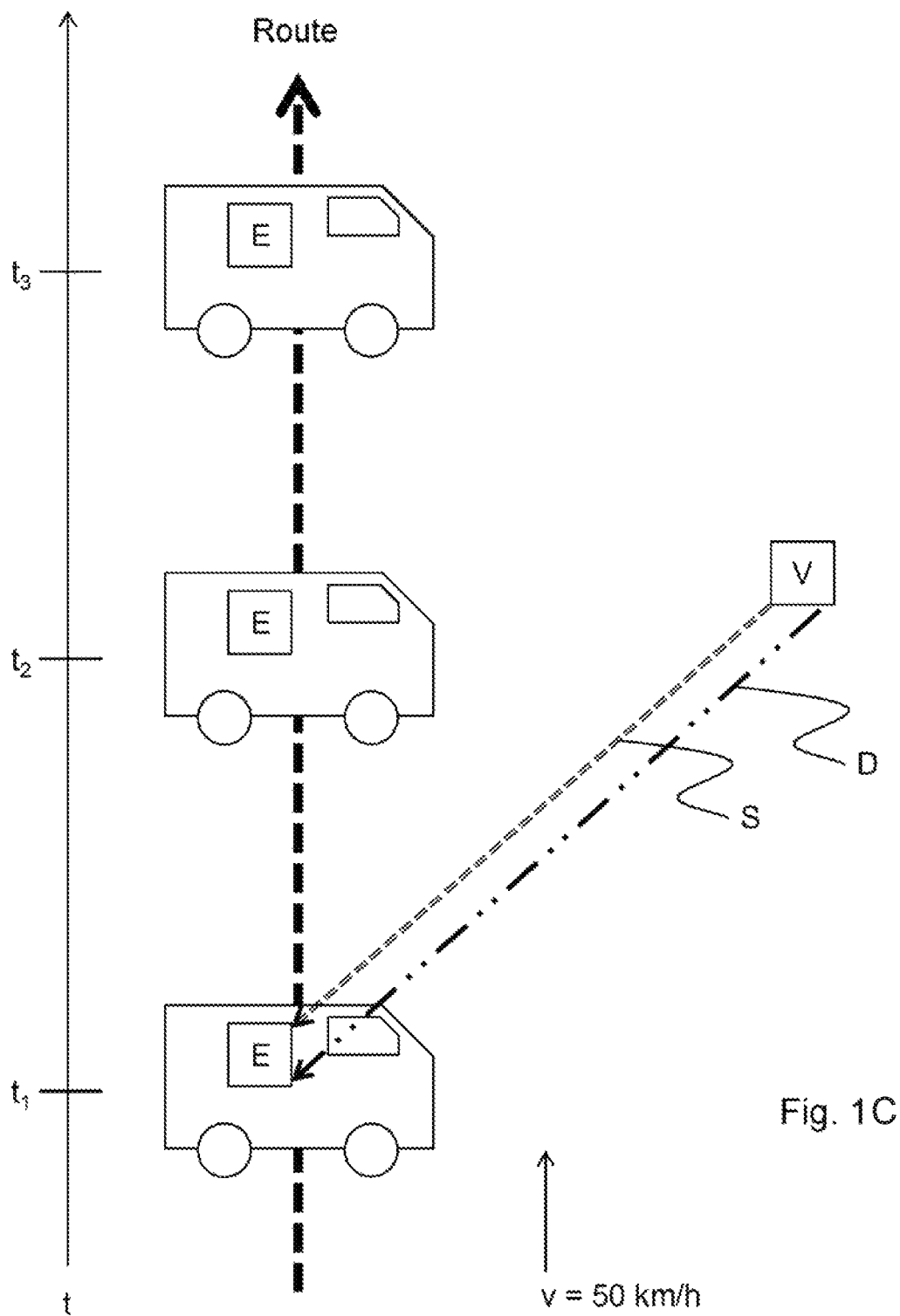

In FIG. 1C, a one-way communication from the consumption meter V to the readout receiver E takes place between the consumption meter V and the readout receiver E. Status information S and consumption data D are transmitted by the consumption meter V and are received by the readout receiver E. The received status information S does not prompt the readout receiver E to request additional information W by using a request command R.

Figure 2:
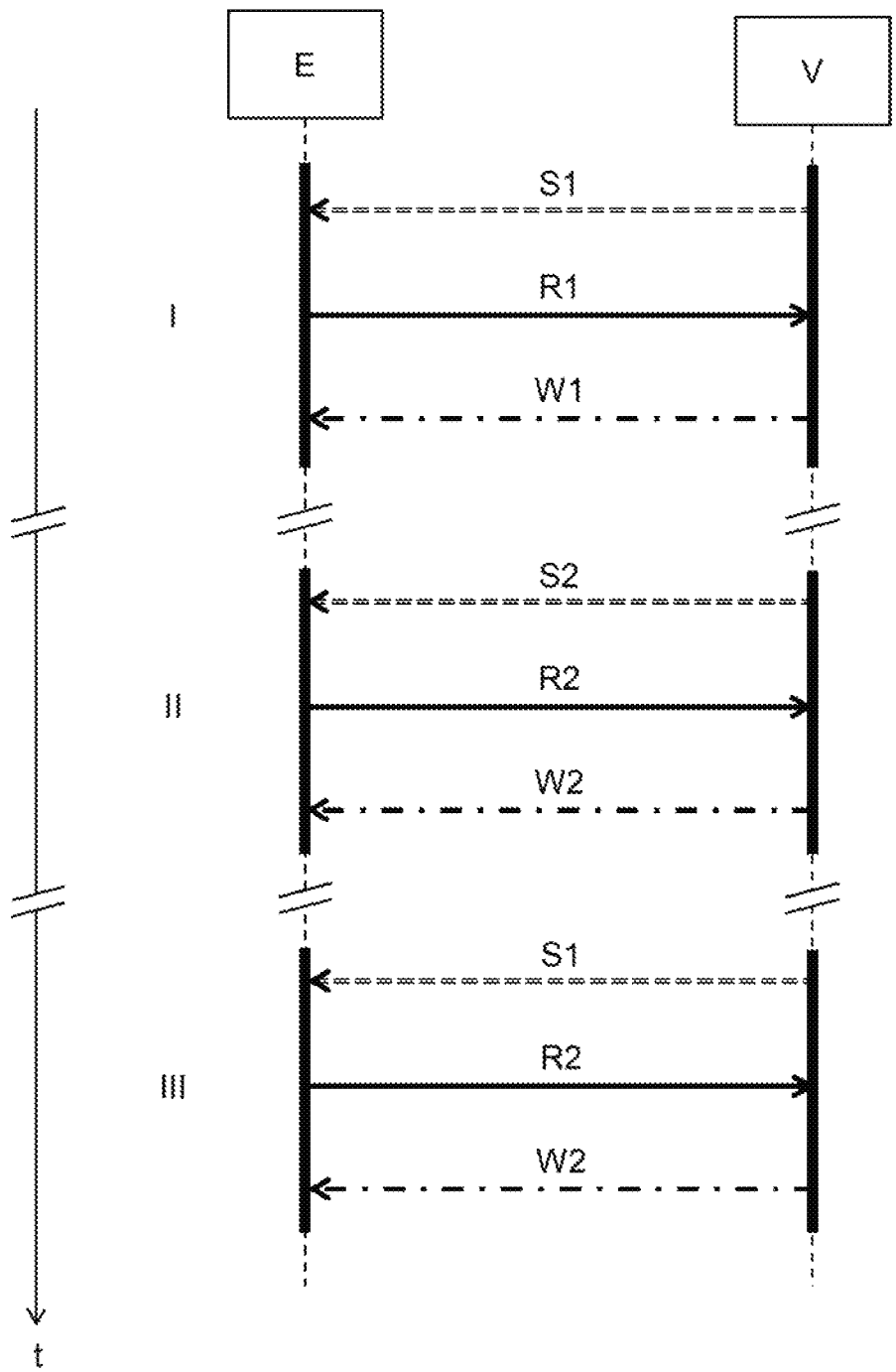
FIG. 2 is a simplified schematic view illustrating a transmission and reception sequence between the consumption meter and the readout receiver.

FIG. 2 shows a simplified schematic transmission and reception sequence between a consumption meter V and a readout receiver E. In a first sequence I, the consumption meter V transmits an alarm as status information S1. The status information S1 is received by the readout receiver E. On the basis of the type of the status information S1 or the type of the alarm, the readout receiver E transmits a request command R1 to the consumption meter V. The request command R may, for example, be an "REQ_UD" command of the M-bus or wireless M-bus. Various options are furthermore defined for the request command R. The different request commands R1 and R2 produce different responses from the consumption meter V, wherein the commands may include, for example, the "REQ_UD1" and "REQ_UD2" commands of the M-bus or wireless M-bus. In the first sequence I, the consumption meter V thus responds to the request command R1 with additional information W1. The readout receiver E requests additional information W1 by using a corresponding request command R1 according to the received status information S1.

If the consumption meter V, as in the second sequence II, transmits different status information S2, the readout receiver E can transmit a different request command R2. The status information S2 may thus, for example, be a leakage alarm. For a leakage alarm of this type, the readout receiver E requires additional information W2 which differs from the information for a different alarm, such as e.g. from the additional information W1 in the presence of the status information S1 in the first sequence I. The readout receiver E transmits a request command R2 accordingly in order to request the additional information W2. An indication of which additional information W is transmitted in the case of a corresponding request command R is stored in the firmware of the consumption meter V.

In a third sequence the consumption meter V transmits status information S1 as in the first sequence I. However, the readout receiver E can request additional information W2 which differs from the requested additional information W1 in the first sequence I. The readout receiver E thus transmits the request command R2 to the consumption meter V after receiving the status information S1. The consumption meter V responds with the transmission of additional information W2.

In one configuration, the status information elements S1 and S2 and the request commands R1 and R2 are transmitted in unencrypted form between the consumption meter V and the readout receiver E. Conversely, the additional information elements W1 and W2 are transmitted from the consumption meter V in encrypted form to the readout receiver E.

Figure 3:
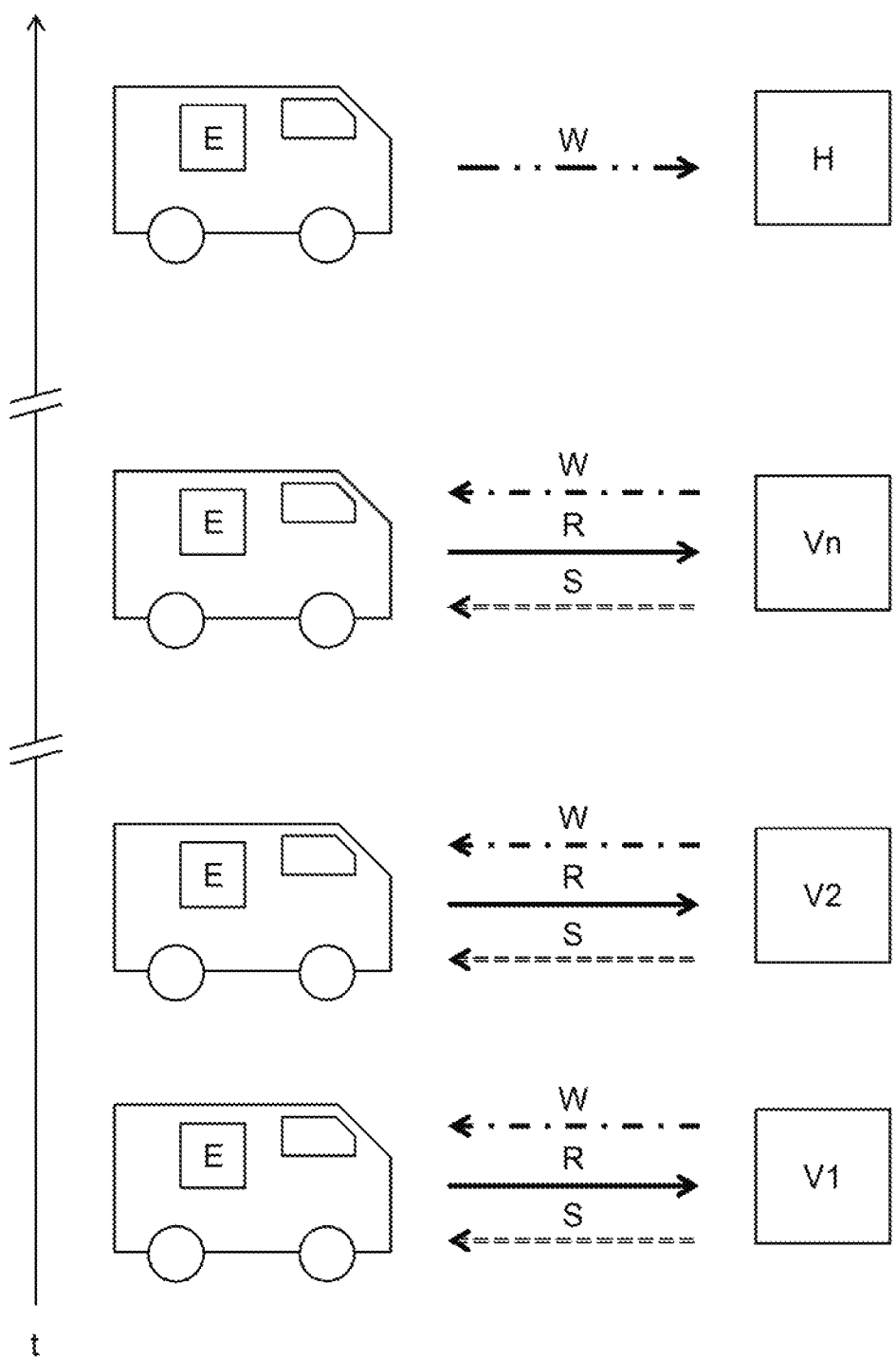
FIG. 3 is a simplified schematic view illustrating a readout procedure for a plurality of consumption meters.

FIG. 3 shows a simplified schematic readout procedure for a plurality of consumption meters V1 to Vn. Each communication between the readout receiver E and a consumption meter V1 to Vn follows the same sequence. The consumption meter V1 to Vn transmits status information S which the readout receiver E receives. A request command R is transmitted from the readout receiver E to the respective consumption meter V1 to Vn according to the previously received status information S. The respective consumption meter V1 to Vn then transmits additional information W in encrypted form to the readout receiver E. The readout receiver E stores the additional information W.

In a first configuration, the readout receiver E itself has the necessary keys for decrypting the encrypted additional information W. The additional information W can thus be decrypted directly in the readout receiver E. The possibility furthermore exists for the status information S and the request commands R to be transmitted additionally in encrypted form.

In a second configuration, the readout receiver E itself does not have the necessary keys for decrypting the additional information W. The received encrypted additional information W is stored in the readout receiver E in its encrypted form. The status information S and the request commands R are transmitted in unencrypted form. Following a readout journey, the encrypted additional information W from the consumption meters V1 to Vn stored in the readout receiver E is transmitted to a head-end system H. The keys for decrypting the additional information W are stored in the head-end system H. The transmission from the readout receiver E to the head-end system H can take place, for example, wirelessly through a radio link and/or by using an optical interface and/or through a wired connection.

Figure 4:
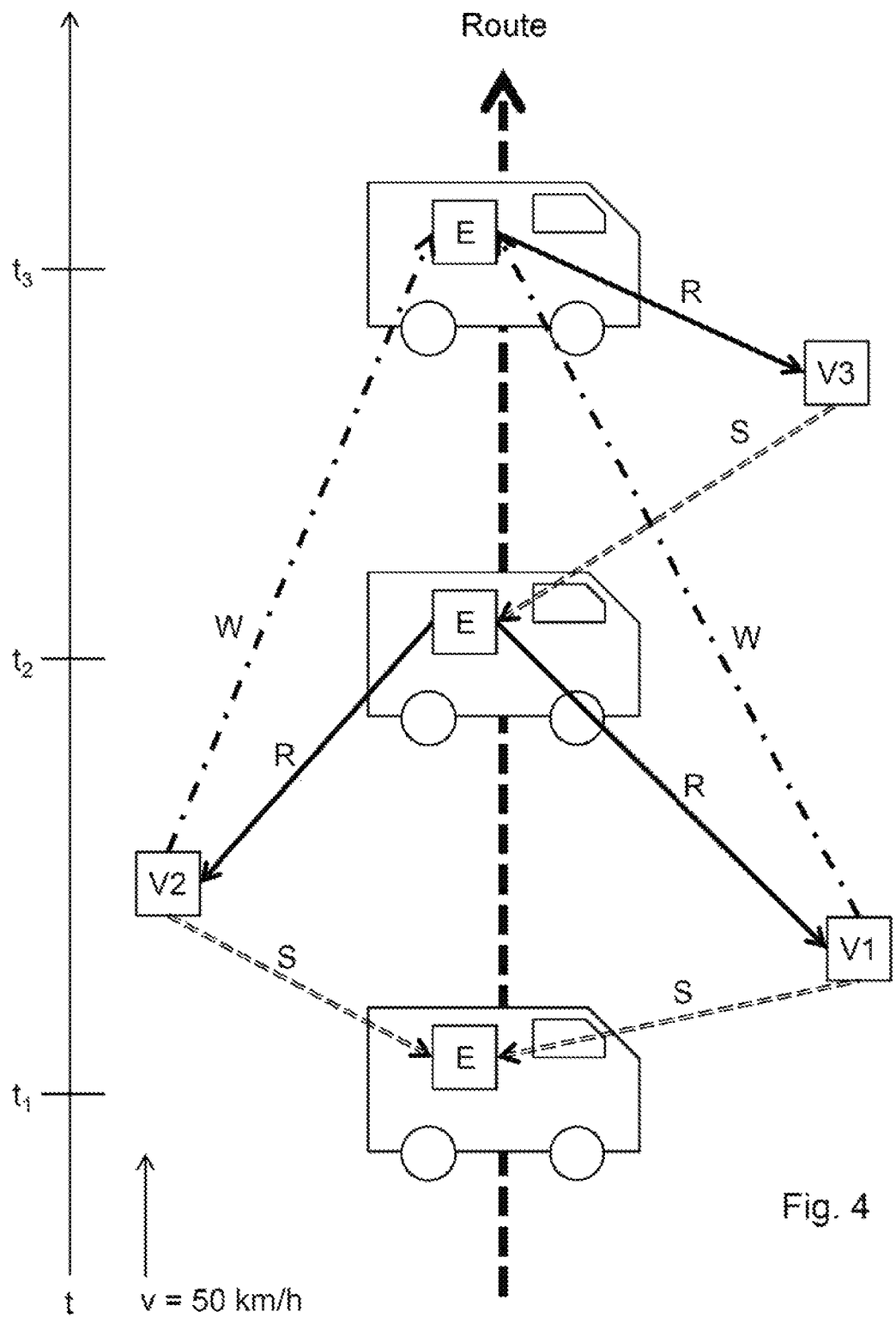
FIG. 4 is a simplified schematic view illustrating a simultaneous readout of a plurality of consumption meters.

A simplified schematic representation of the simultaneous readout of the plurality of consumption meters V1 to V3 is shown in FIG. 4. The readout receiver E is located in a vehicle which is moving along a route at a speed of 50 kilometers per hour. A plurality of consumption meters V1 to V3 is located along the route. The consumption meters V1 to V3 transmit status information S by default, independently from the presence of the readout receiver E. Along the route, the readout receiver E first receives the status information S at time $t_1$ from the consumption meter V1, followed by the status information S from the consumption meter V2. The readout receiver E in each case transmits a request command R at time $t_2$ on the basis of the received status information S from the consumption meters V1 and V2. At the same time, the readout receiver E already receives the status information S from the consumption meter V3. A request command R is then transmitted to the consumption meter V3 at time $t_3$, temporally coinciding with the reception of the additional information W from the consumption meters V1 and V2. The readout receiver E can simultaneously receive a plurality of status information elements S and additional information elements W and transmit request commands R. The possibility furthermore exists for the readout receiver E to transmit and receive simultaneously.

The following is a summary list of reference numerals and the corresponding structure used in the above description of the invention:
V Consumption meter
E Readout receiver
S Status information
W Additional information
R Request command
H Head-end system
D Consumption data

The invention claimed is:

1. A method for operating a mobile readout system, the method comprising:
   providing at least one stationary consumption meter and a mobile readout receiver for reading out the at least one consumption meter as the readout receiver moves past the at least one consumption meter at a relative speed between the at least one consumption meter and the readout receiver of up to 70 kilometers per hour; and
   carrying out a two-way communication between the at least one consumption meter and the readout receiver, the two-way communication including:
      using the at least one consumption meter to transmit status information stored in the at least one consumption meter, the status information including at least one of characteristic status data or alarms or alarm status data and the status information not including consumption data;
      using the readout receiver to receive the status information;
      using the readout receiver to request additional information from the at least one consumption meter by using a request command, the readout receiver requesting the additional information from the at least one consumption meter based on the status information transmitted from the at least one consumption meter to the readout receiver; and
      encrypting and transmitting the additional information from the at least one consumption meter to the readout receiver.

2. The method according to claim 1, which further comprises transmitting the status information by the at least one consumption meter in unencrypted form.

3. The method according to claim 2, which further comprises:
   using the at least one consumption meter to transmit encrypted consumption data stored in the at least one consumption meter; and
   using the readout receiver to receive the encrypted consumption data.

4. The method according to claim 1, which further comprises storing in firmware of the at least one consumption meter an indication of which additional information is transmitted.

5. The method according to claim 1, which further comprises transmitting the request command, from the readout receiver to the at least one consumption meter for the transmission of additional information, in unencrypted form.

6. The method according to claim 1, which further comprises defining at least two options for the request command, and transmitting different additional information elements for each option.

7. The method according to claim 1, which further comprises storing in the readout receiver keys for decrypting the communication.

8. The method according to claim 1, which further comprises not storing keys in the readout receiver for decrypting the communication.

9. The method according to claim 8, which further comprises storing in a head-end system the keys for decrypting the communication.

10. The method according to claim 9, which further comprises transferring the additional information stored in the readout receiver into the head-end system and decrypting the additional information in the head-end system.

11. The method according to claim 1, which further comprises setting a relative speed between the at least one consumption meter and the readout receiver to be up to 50 kilometers per hour.

12. The method according to claim 1, which further comprises not interrupting the movement of the readout receiver past the at least one consumption meter for the readout of the at least one consumption meter.

13. The method according to claim 1, which further comprises setting a relative speed of the readout receiver and the at least one consumption meter to be not equal to zero kilometers per hour.

14. The method according to claim 13, which further comprises reducing the relative speed of the readout receiver and the at least one consumption meter for the readout by less than 50%.

15. The method according to claim 13, which further comprises reducing the relative speed of the readout receiver and the at least one consumption meter for the readout by less than 20%.

16. The method according to claim 13, which further comprises reducing the relative speed of the readout receiver and the at least one consumption meter for the readout by less than 10%.

17. The method according to claim 13, which further comprises not reducing the relative speed of the readout receiver and the at least one consumption meter for the readout.

18. A mobile readout receiver, comprising:
a receiver for acquiring data from a plurality of spatially distributed consumption meters by using radio transmission as the readout receiver moves past the consumption meters at a relative speed between the consumption meters and the readout receiver of up to 70 kilometers per hour;
said receiver carrying out a two-way communication between the consumption meters and the readout receiver by:
transmitting status information stored in the consumption meters, the status information including at least one of characteristic status data or alarms or alarm status data and the status information not including consumption data;
receiving the status information at the readout receiver;
requesting additional information from the consumption meters by using a request command from the readout receiver, the readout receiver requesting the additional information from the consumption meters based on the status information transmitted from the consumption meters to the readout receiver; and
transmitting encrypted additional information from the consumption meters to the readout receiver.

* * * * *